United States Patent (10) Patent No.: US 9,335,862 B1
Kritt et al. (45) Date of Patent: May 10, 2016

(54) VIRTUAL MULTI-DEVICE NAVIGATION IN SURFACE COMPUTING SYSTEM

(71) Applicant: International Business Machines Corporation, Armonk, NY (US)

(72) Inventors: Barry A. Kritt, Research Triangle Park, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 14/541,193

(22) Filed: Nov. 14, 2014

(51) Int. Cl.
G06F 3/045 (2006.01)
G06F 3/041 (2006.01)
G06F 3/01 (2006.01)
G06F 3/0488 (2013.01)
G06F 3/0481 (2013.01)
G06F 3/00 (2006.01)
H04N 5/33 (2006.01)

(52) U.S. Cl.
CPC .............. *G06F 3/0416* (2013.01); *G06F 3/005* (2013.01); *G06F 3/017* (2013.01); *G06F 3/0412* (2013.01); *G06F 3/0488* (2013.01); *G06F 3/04817* (2013.01); *H04N 5/33* (2013.01); *G06F 2203/04104* (2013.01); *G06F 2203/04806* (2013.01); *G06F 2203/04808* (2013.01)

(58) Field of Classification Search
CPC .............. G06F 3/0416; G06F 3/04817; G06F 3/04847; G06F 3/0488; G06F 2203/04806; G06F 2203/04808; G06F 2221/2141
See application file for complete search history.

(56) References Cited

U.S. PATENT DOCUMENTS

| 8,264,455 B2 | 9/2012 | Fiebrink et al. |
| 8,719,920 B2 | 5/2014 | Do et al. |
| 2009/0126010 A1 | 5/2009 | Chakra et al. |
| 2009/0244016 A1* | 10/2009 | Casparian ............. G06F 1/1616 345/173 |
| 2011/0083111 A1* | 4/2011 | Forutanpour ......... G06F 1/1694 715/863 |
| 2011/0314168 A1* | 12/2011 | Bathiche ............... H04W 12/06 709/228 |
| 2012/0077436 A1* | 3/2012 | Konded .............. G06F 3/04883 455/41.2 |
| 2013/0013451 A1* | 1/2013 | Kritt .................... G06Q 10/063 705/26.9 |
| 2013/0238744 A1* | 9/2013 | Paschke ................. G06F 9/543 709/216 |
| 2013/0241854 A1* | 9/2013 | Yoo ....................... G06F 3/0488 345/173 |
| 2014/0005934 A1* | 1/2014 | Chia ...................... G01C 21/00 701/450 |
| 2015/0199429 A1* | 7/2015 | Kritt ................. G06F 17/30867 707/776 |
| 2015/0199538 A1* | 7/2015 | Kritt ................... G06F 21/6245 726/26 |

OTHER PUBLICATIONS

Moren, "Going under the iPad's hood with Settings," Macworld, Apr. 2010, 6 pages.
"Multiuser screen," aperiodic.net, Oct. 2010, 2 pages.
"Desktop Screen Share," Screenleap, Oct. 2011, 3 pages.

* cited by examiner

*Primary Examiner* — Joe H Cheng
(74) *Attorney, Agent, or Firm* — VanLeeuwen & VanLeeuwen; Damien C. Josephs

(57) ABSTRACT

An approach is provided in which a touchscreen computing system generates a first virtual device instance and a second virtual device instance on a touchscreen in response to detecting a first physical device and a second physical device in proximity to the touchscreen computer system. The touchscreen computer system detects a touch gesture on the touchscreen that indicates a request to wirelessly connect the first physical device to the second physical device. As such, the touchscreen computer system sends instructions to the first physical device to establish a wireless connection with the second physical device.

20 Claims, 9 Drawing Sheets

VIRTUAL MULTI-DEVICE NAVIGATION IN SURFACE COMPUTING SYSTEM

BACKGROUND

Touchscreen computer systems allow a user to request actions using touch gestures. Surface computing systems are table-based touchscreen computer systems that allow users to place a device on the table and the surface computing system detects the device via cameras inside the surface computing system.

The surface computing system's cameras "see" a near-IR (infrared) image of objects placed on the screen and perform functions according to loaded software programs. The surface computing system may perform functions corresponding to the object even when the object is not an electronic device. For example, a physical paintbrush may be placed on the screen and the surface computing system may be programmed to initiate a software program that allows a user to create a digital painting on the table. This is possible because, by using cameras for input, the surface computing system does not rely on electrical properties required by conventional touchscreen or touchpad devices, such as detecting the capacitance, electrical resistance, or temperature of a device.

BRIEF SUMMARY

According to one embodiment of the present disclosure, an approach is provided in which a touchscreen computing system generates a first virtual device instance and a second virtual device instance on a touchscreen in response to detecting a first physical device and a second physical device in proximity to the touchscreen computer system. The touchscreen computer system detects a touch gesture on the touchscreen that indicates a request to wirelessly connect the first physical device to the second physical device. As such, the touchscreen computer system sends instructions to the first physical device to establish a wireless connection with the second physical device.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
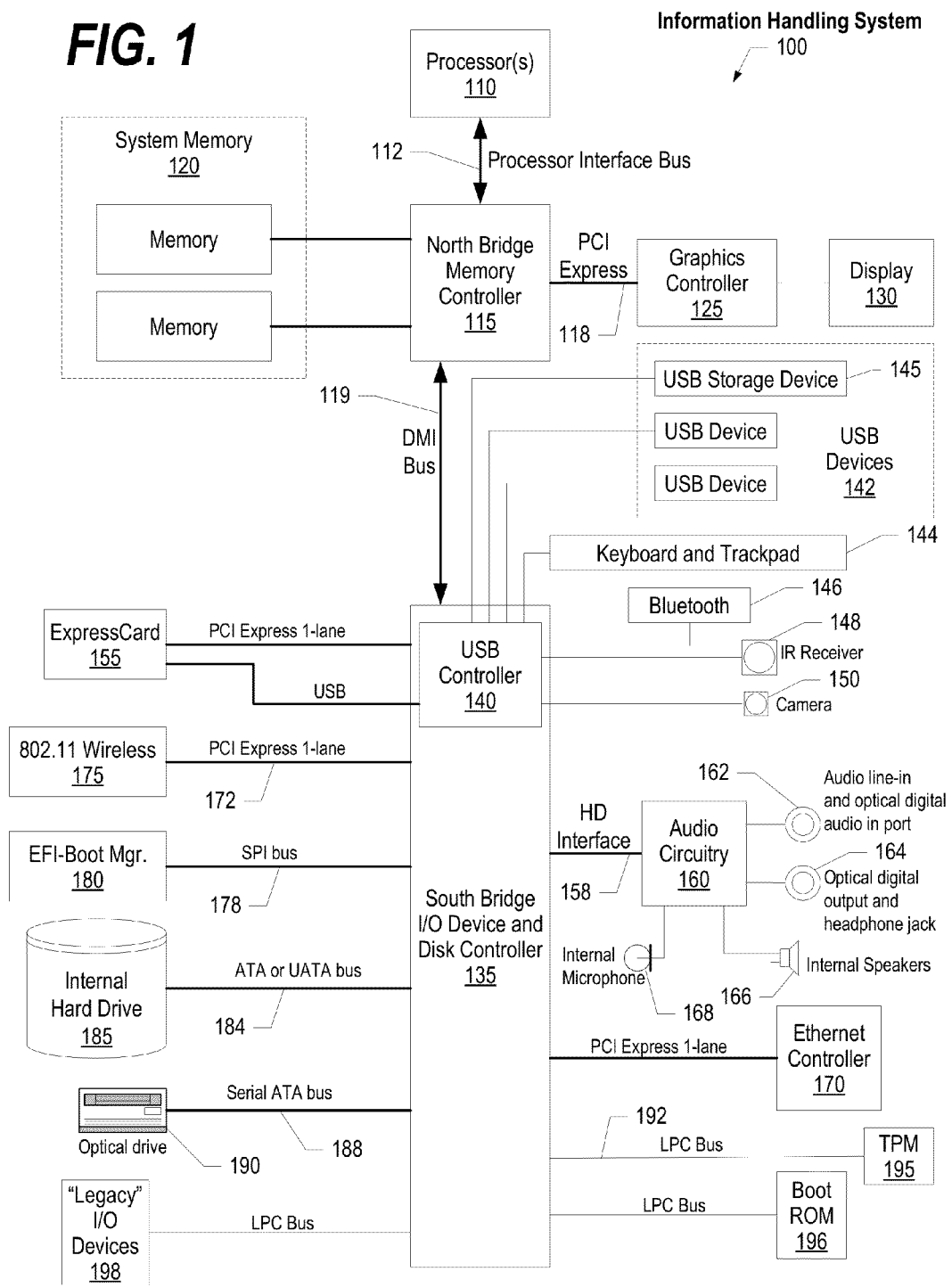
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to North Bridge 115, which is also known as the Memory Controller Hub (MCH). North Bridge 115 connects to system memory 120 and provides a means for processor(s) 110 to access the system memory. Graphics controller 125 also connects to North Bridge 115. In one embodiment, PCI Express bus 118 connects North Bridge 115 to graphics controller 125. Graphics controller 125 connects to display device 130, such as a computer monitor.

North Bridge 115 and South Bridge 135 connect to each other using bus 119. In one embodiment, the bus is a Direct Media Interface (DMI) bus that transfers data at high speeds in each direction between North Bridge 115 and South Bridge 135. In another embodiment, a Peripheral Component Interconnect (PCI) bus connects the North Bridge and the South Bridge. South Bridge 135, also known as the I/O Controller Hub (ICH) is a chip that generally implements capabilities that operate at slower speeds than the capabilities provided by the North Bridge. South Bridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus 192 also connects South Bridge 135 to Trusted Platform Module (TPM) 195. Other components often included in South Bridge 135 include a Direct Memory Access (DMA) controller, a Programmable Interrupt Controller (PIC), and a storage device controller, which connects South Bridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to South Bridge 135 using both the Universal Serial Bus (USB) the PCI Express bus. South Bridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to South Bridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to South Bridge 135 using Serial ATA (SATA) bus 188. Serial ATA adapters and devices communicate over a high-speed serial link. The Serial ATA bus also connects South Bridge 135 to other forms of storage devices, such as hard disk drives. Audio circuitry 160, such as a sound card, connects to South Bridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to South Bridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

Figure 2:
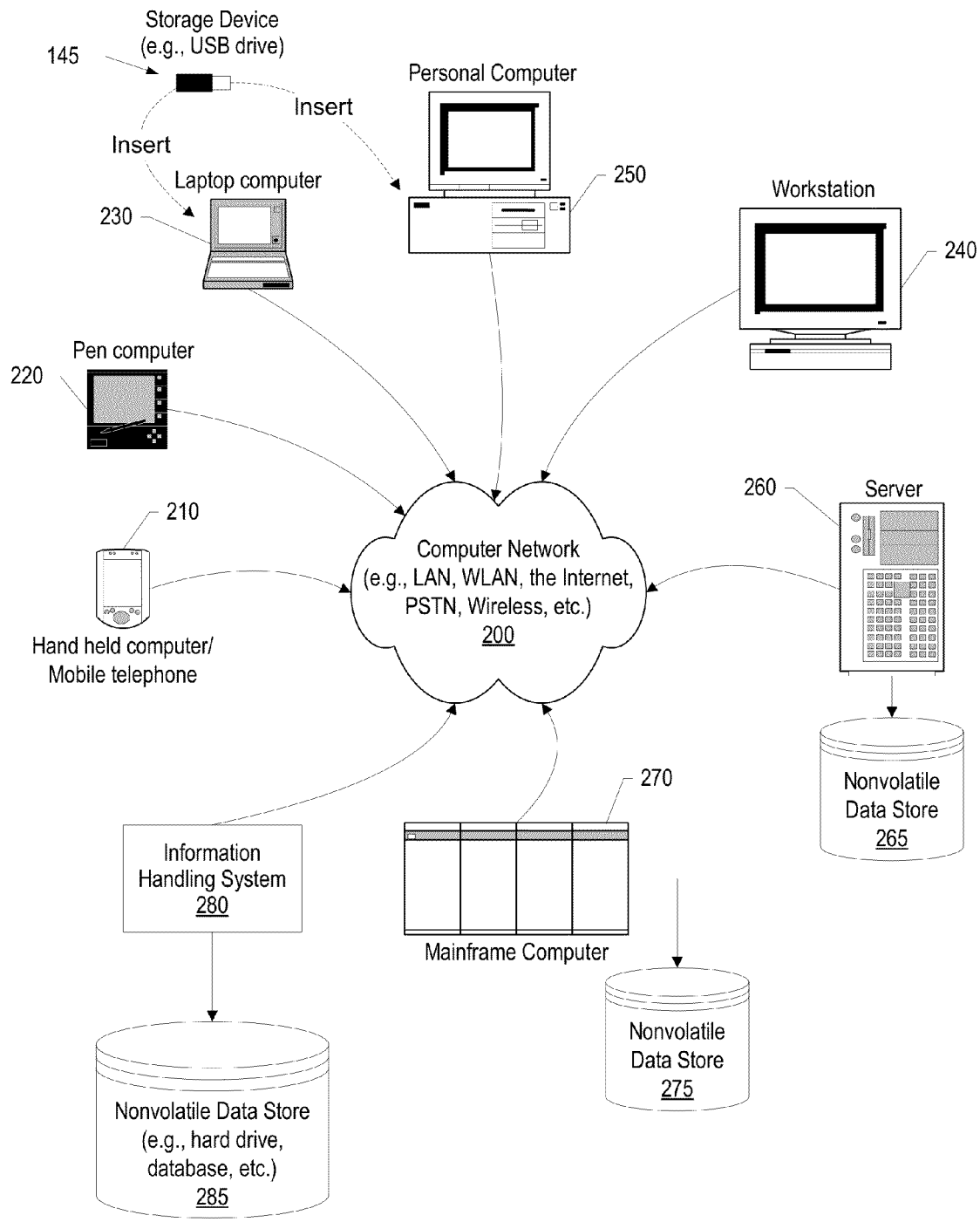
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
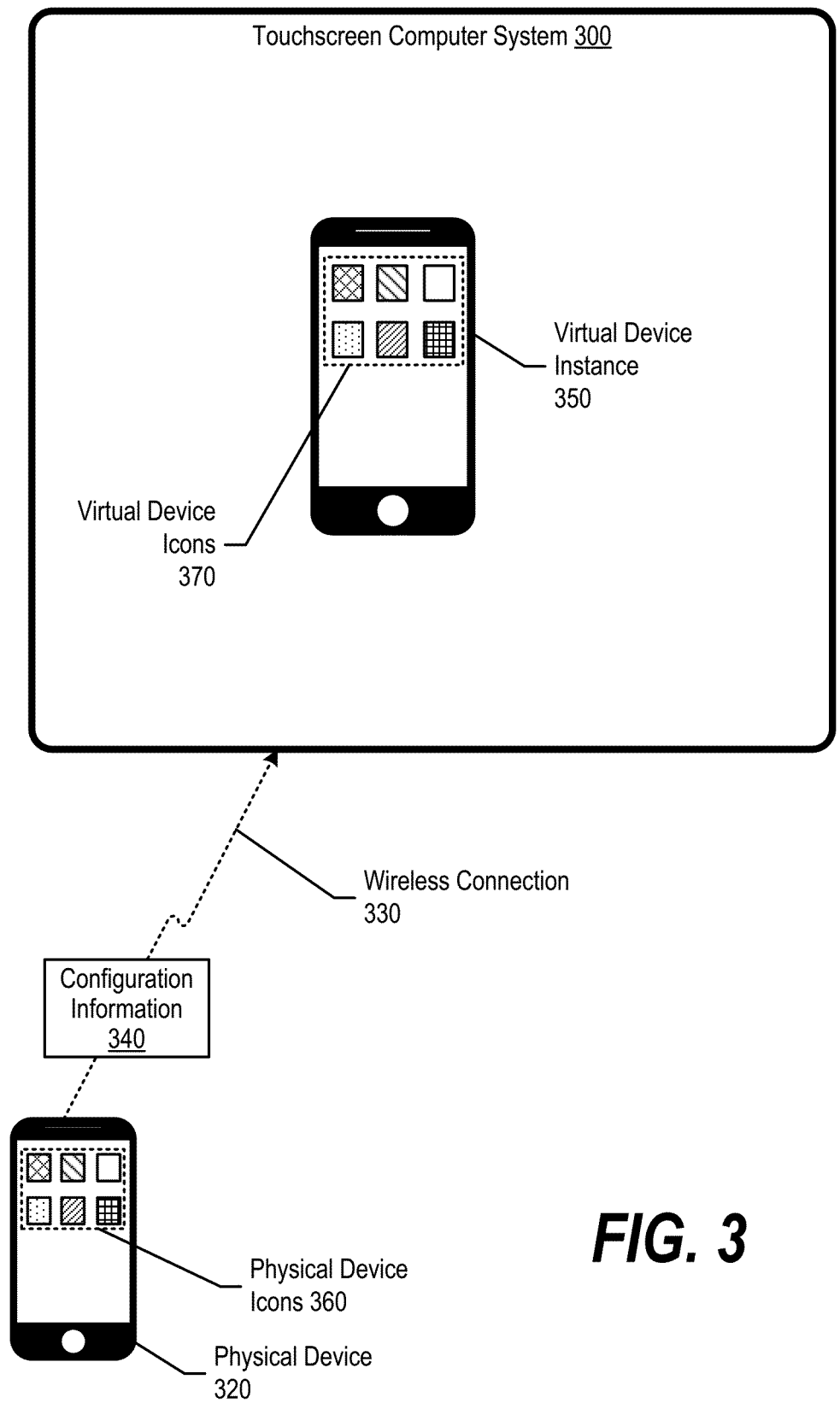
FIG. 3 is an exemplary diagram depicting a touchscreen computer system connecting to a proximate physical device and displaying a corresponding virtual device instance on a touchscreen.

FIG. 3 is an exemplary diagram depicting a touchscreen computer system connecting to a proximate physical device and displaying a corresponding virtual device instance on a touchscreen. Touchscreen computer system 300 may be a computer system with a touch-sensitive display, such as a Surface computing table, a laptop computer with a touch-sensitive display, or other type of electronic system that includes a touch-sensitive screen and processing capabilities to interpret touchscreen gestures.

Touchscreen computer system 300 includes a wireless personal area network (WPAN) transceiver that searches for nearby devices. For example, touchscreen computer system 300 may include a Bluetooth transceiver that searches for nearby Bluetooth devices. Touchscreen computer system 300 detects physical device 320 and performs handshaking protocols to establish wireless connection 330 between touchscreen computer system 300 and physical device 320 (e.g., a wireless personal access network (WPAN) connection). In one embodiment, physical device 320 is not in physical contact with touchscreen computer system 300. For example, physical device 320 may be in a user's pocket and establish wireless personal area network connection 330 with touchscreen computer system 300 without being physically connected to touchscreen computer system 300 via a cable or in physical contact with touchscreen computer system 300, such as being placed on touchscreen computer system 300.

Physical device 320 sends configuration information 340 to touchscreen computer system 300 and touchscreen computer system 300 displays virtual device instance 350 based upon configuration information 340. In one embodiment, configuration information 340 includes physical device 320's identification information (e.g., model number) and computer system 300 maintains a set of virtual device instance properties for various physical devices, similar to that of maintaining a group of software drivers. In this embodiment, touchscreen computer system 300 matches physical device 320's model number to the virtual device instance properties and displays virtual device instance 350 based on the matched virtual device instance properties.

In another embodiment, physical device 320 provides device data attributes to touchscreen computer system 300 via configuration information 340 or other messages that describe data stored on physical device 320. For example, the device data attributes may identify applications or files stored on physical device 320. In this embodiment, and as shown in FIG. 3, touchscreen computer system 300 creates virtual device icons 370 that match physical device icons 360 on physical device 320. As a result, when a user selects one of virtual device icons 370 via a touchscreen gesture on touchscreen computer system 300, touchscreen computer system 300 sends instructions to physical device 320 via wireless connection 330 to perform actions according to the touchscreen gesture (see FIG. 5, 6, 7, and corresponding text for further details).

Figure 4:
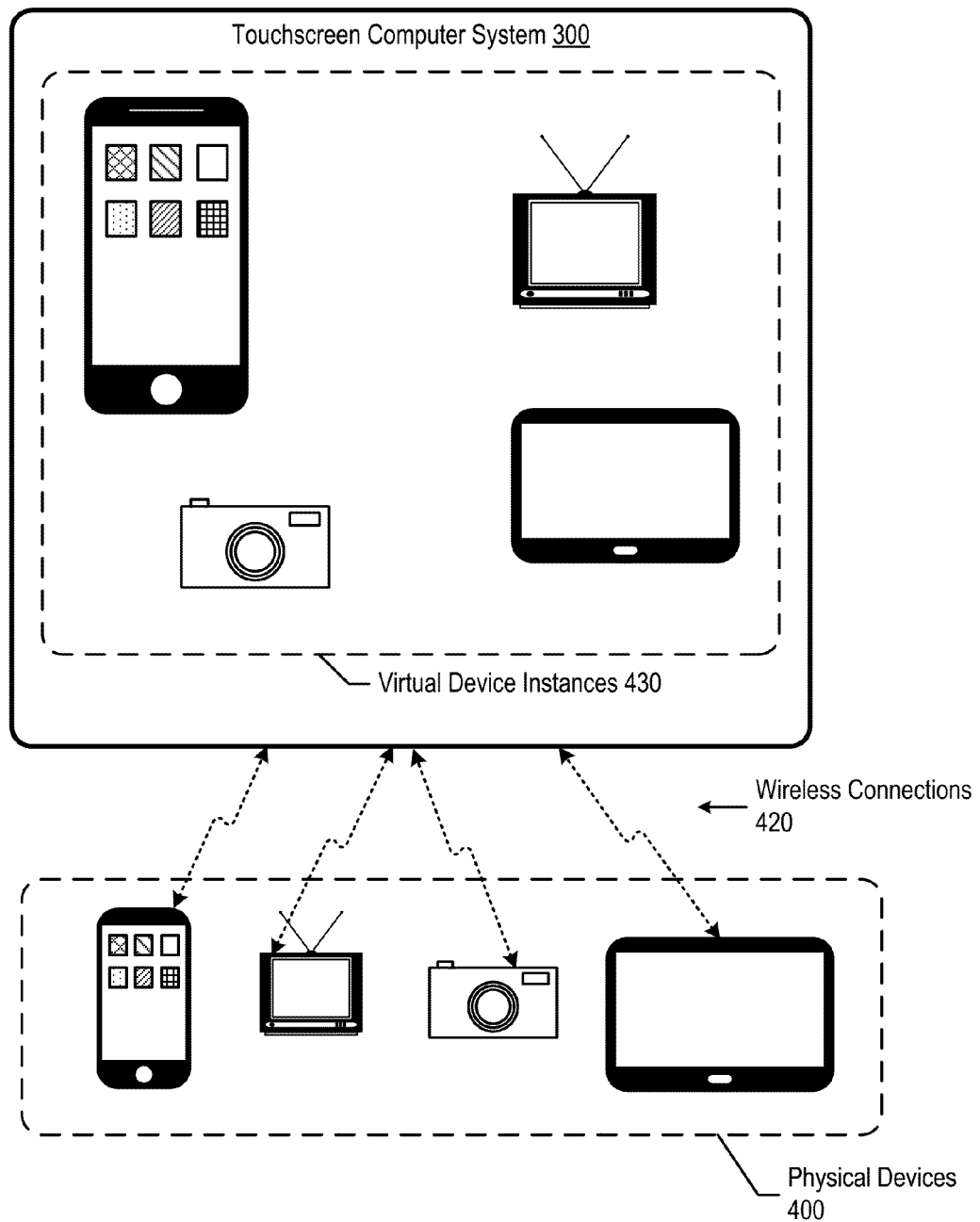
FIG. 4 is an exemplary diagram depicting a touchscreen computer system establishing multiple wireless connections to various types of physical devices and displaying multiple virtual device instances on a touchscreen.

FIG. 4 is an exemplary diagram depicting a touchscreen computer system establishing multiple wireless connections to various types of physical devices and displaying multiple virtual device instances on a touchscreen.

Touchscreen computer system 300 establishes individual wireless connections 420 (e.g., Bluetooth connections) with each of physical devices 400 shown in FIG. 4 and receives configuration information from the individual physical devices over the established wireless connections. In turn, touchscreen computer system 300 displays virtual device instances 430 on the touchscreen. In one embodiment, as discussed above, physical devices 400 provide identification information (e.g., model numbers) and touchscreen computer system 300 matches the identification information to locally stored virtual device object files and displays virtual device instances 420 based on the matched virtual device object files. In this embodiment, touchscreen computer system 300 then populates virtual device instances 420 based upon the corresponding device's configuration information received over wireless connections 420. In turn, a user may instruct a first one of physical devices 400 to establish a direct wireless connection with a second one of physical devices 400 to transfer data between the first physical device and the second physical device (see FIG. 5 and corresponding text for further details).

In one embodiment, the physical device is a television and a user may perform a multi-touch enlargement gesture that enlarges the corresponding television virtual device instance. In turn, the enlarged television virtual device instance may display television broadcasts received from the physical television via one of wireless connections 420.

Figure 5:
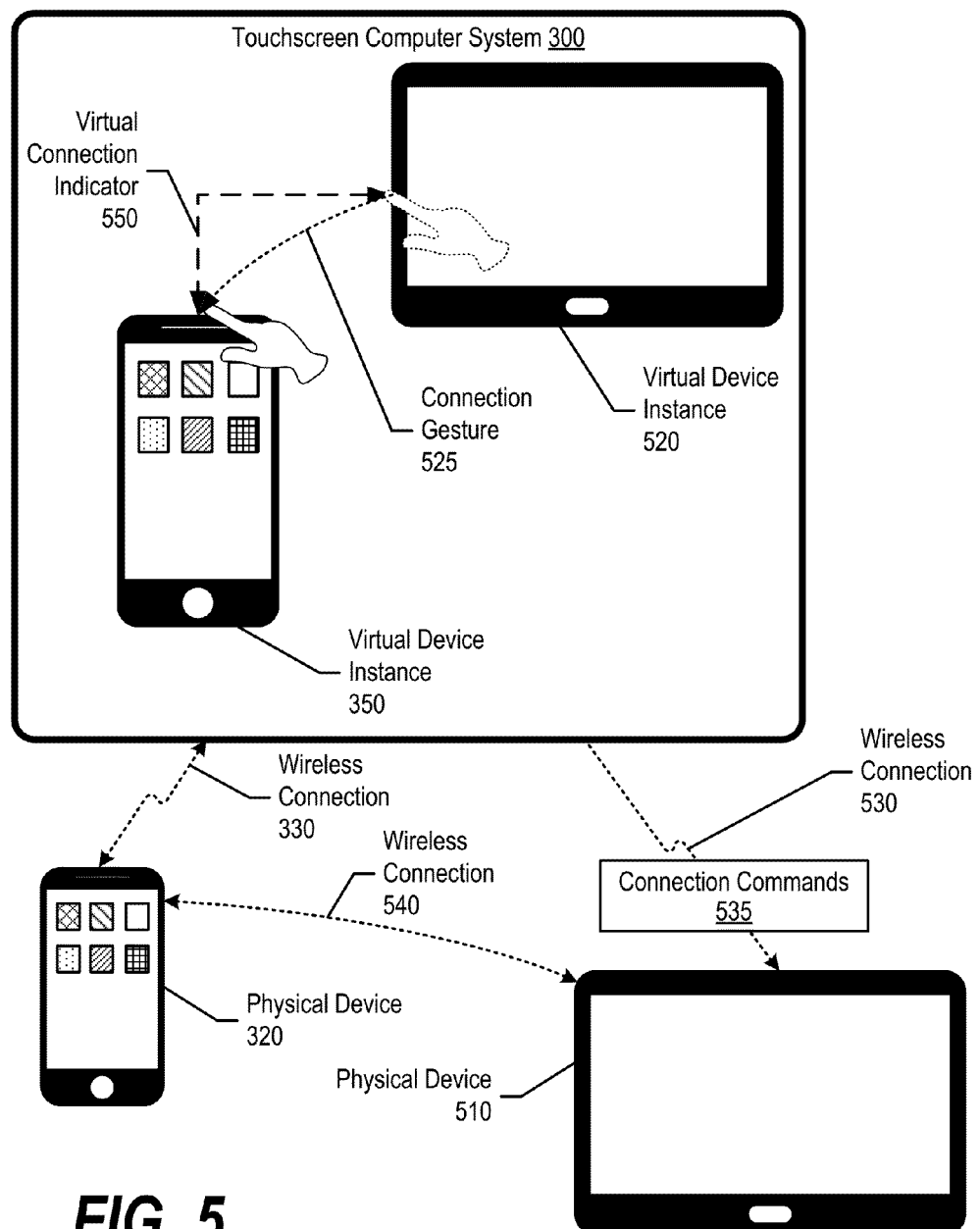
FIG. 5 is an exemplary diagram depicting a touchscreen computer system detecting a user's connection gesture and sending instructions to a physical device to connect to a second physical device over a wireless network.

FIG. 5 is an exemplary diagram depicting a touchscreen computer system detecting a user's connection gesture and sending instructions to a corresponding first physical device to establish a wireless connection with a second physical device. Touchscreen computer system 300 detects connection gesture 525 that, in one embodiment, is a swipe from a first virtual device instance (virtual device instance 520) to a second virtual device instance (virtual device instance 350). Touchscreen computer system 300 interprets connection gesture 525 as the user requesting establishment of a wireless connection between corresponding physical device 510 and physical device 320.

As such, touchscreen computer system 300 sends connection commands 5 to physical device 510 via wireless connection 530 to initiate wireless connection 540 (e.g., WiFi, Bluetooth, etc.) with physical device 320. In one embodiment, physical device 510 or physical device 320 sends a confirmation message to touchscreen computer system 300 via wireless connection 530 or wireless connection 330 that confirms wireless connection 540 is established. Touchscreen computer system 300, in turn, displays virtual connection indicator 550 that signifies the established wireless connection between physical device 510 and physical device 320. As such, the user may transfer data between physical device 320 and physical device 510 by performing touchscreen gestures on touchscreen computer system 300 (see FIG. 6 and corresponding text for further details).

Figure 6:
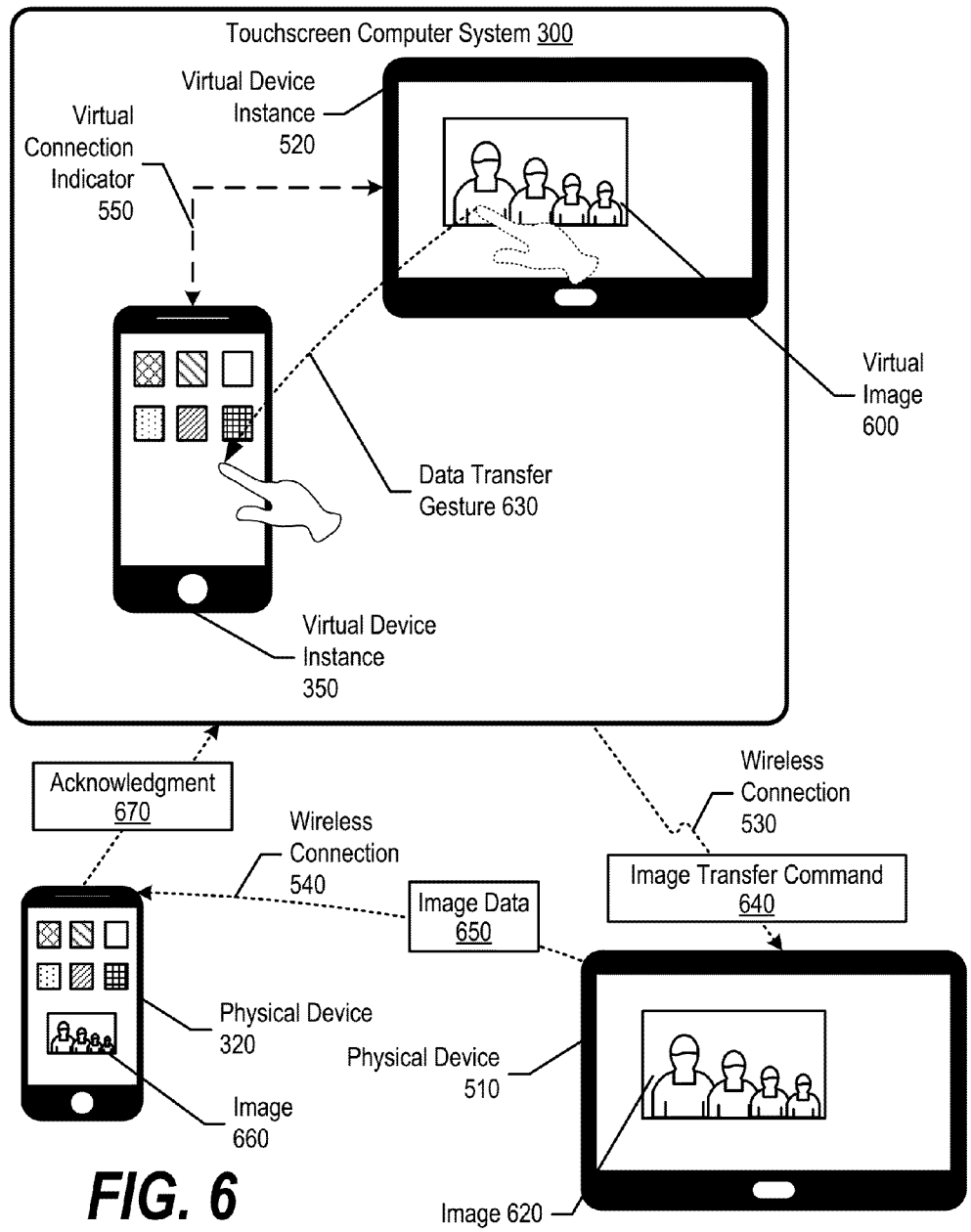
FIG. 6 is an exemplary diagram depicting a touchscreen computer system detecting a user's data transfer gesture and sending instructions to a first physical device to send data to a second physical device over an established wireless connection.

FIG. 6 is an exemplary diagram depicting a touchscreen computer system detecting a data transfer gesture and sending instructions to a first physical device to send data to a second physical device.

A user may use touchscreen computer system 300 to transfer data (e.g., files, text-based data, images, folders, etc.) from a first physical device to a second physical device by performing a data transfer gesture, such as data transfer gesture 630. FIG. 6 shows an embodiment where the user wishes to copy an image 620 stored on physical device 510 to physical device 320. As such, the user selects virtual image 600 and performs data transfer gesture 630, for example, by dragging virtual image 600 over to virtual device instance 350. As a result, touchscreen computer system 300 sends image transfer instructions 640 over wireless connection 530 to physical device 510.

Physical device 510 responds by sending image data 650 over wireless connection 540 to physical device 320. In turn, physical device 320 displays image 660 and sends acknowledgement 670 to touchscreen computer system 300 indicating that the image was transferred successfully. In one embodiment, touchscreen computer system 300 displays an image icon on virtual device instance 350 when touchscreen computer system 300 receives acknowledgement 670.

Figure 7:
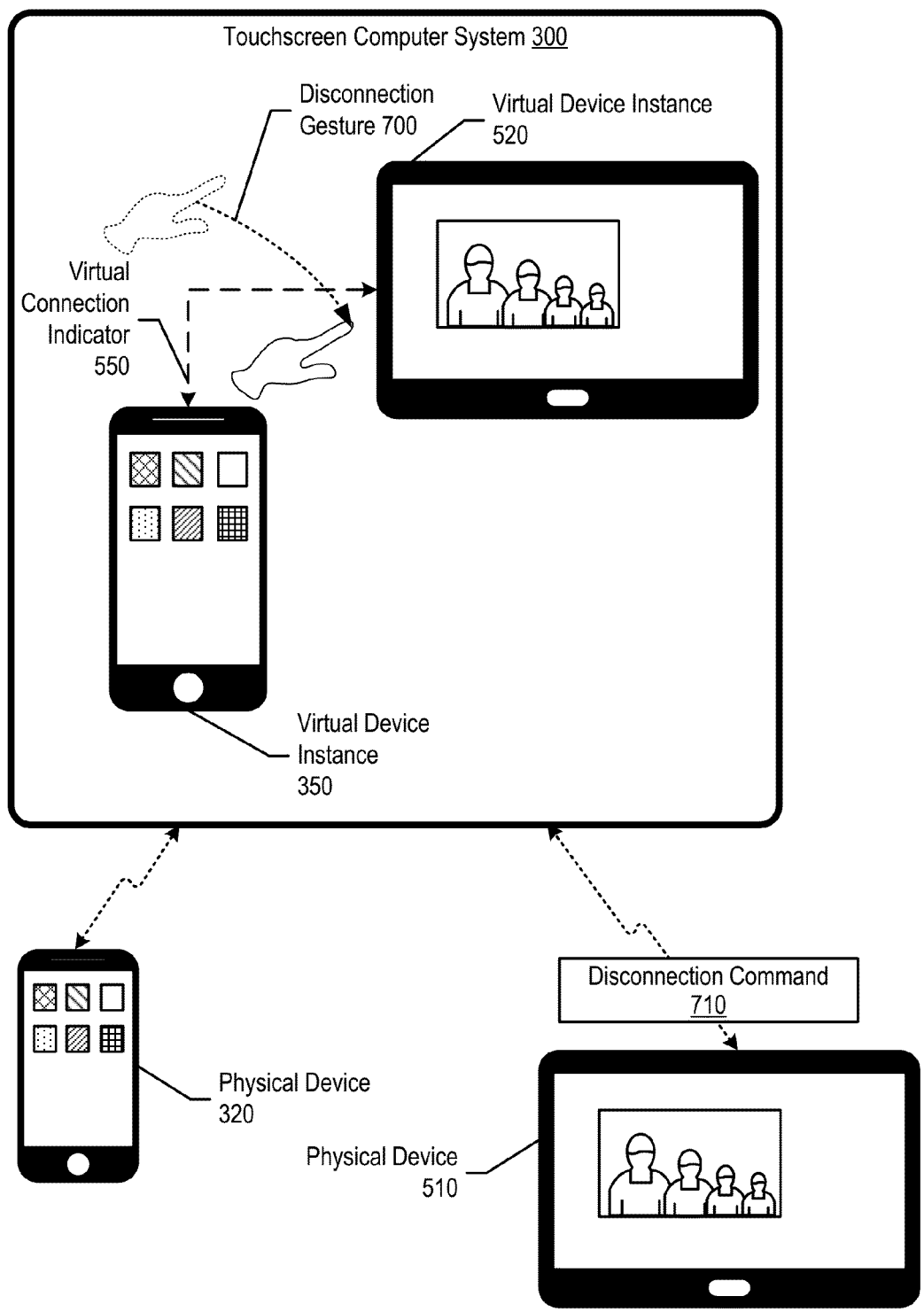
FIG. 7 is an exemplary diagram depicting a touchscreen computer system detecting a user's disconnect gesture and sending instructions to a first physical device to wirelessly disconnect from a second physical device.

FIG. 7 is an exemplary diagram depicting a touchscreen computer system detecting a user's disconnect gesture and sending instructions to a first physical device to wirelessly disconnect from a second physical device.

When a user wishes to terminate a wireless connection between two wirelessly connected physical devices, the user performs a gesture, such as disconnect gesture 700. In turn, touchscreen computer system 300 sends disconnect instructions 710 to physical device 510 to terminate wireless connection 540 (shown in FIGS. 5 and 6). In turn, touchscreen computer system 300 removes virtual connection indicator 550 from the touchscreen, which indicates to the user that wireless connection 540 is no longer active.

In one embodiment, a user may perform a different type of disconnect gesture to wirelessly disconnect a connected physical device from touchscreen computer system 300. For example, the user may touch virtual device instance 350 and swipe off the touch screen to instruct touchscreen computer system 300 to wireless disconnect from physical device 320 and remove virtual device instance 350 from the touchscreen.

Figure 8:
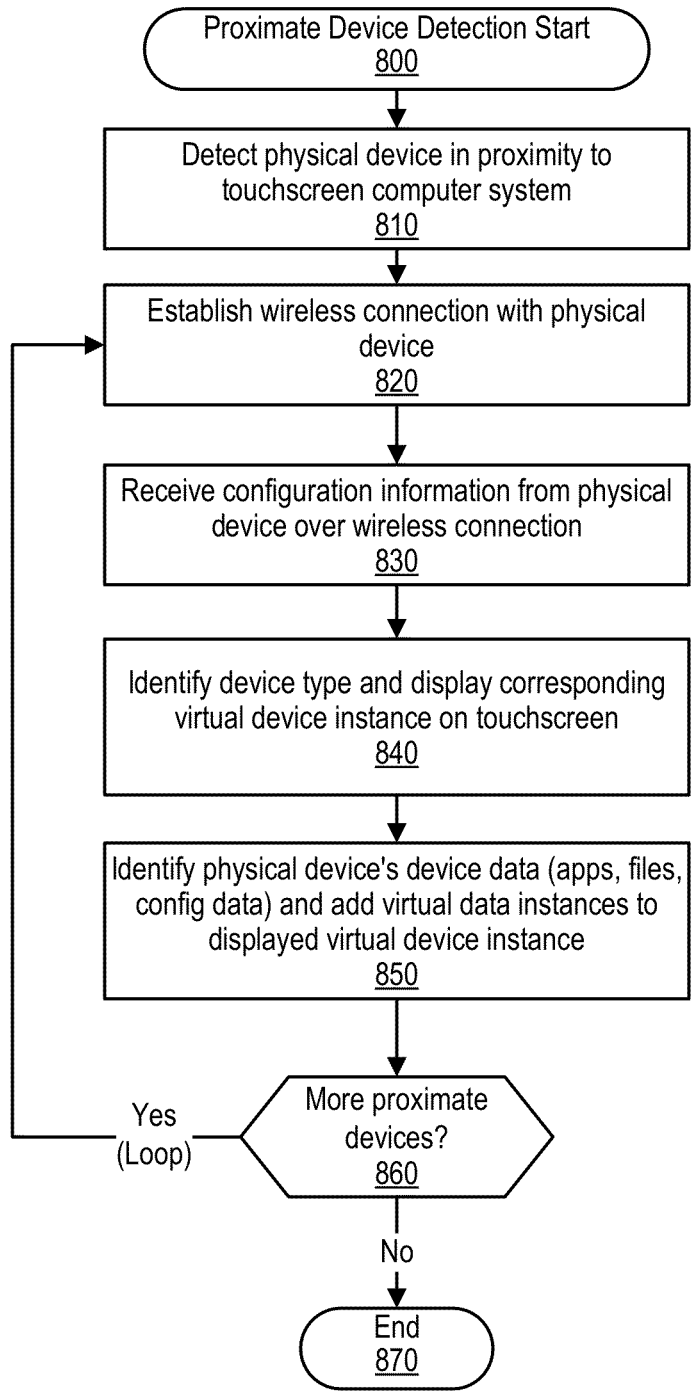
FIG. 8 is an exemplary flowchart depicting steps taken to detect a proximate physical device and create a corresponding virtual device instance on a touchscreen.

FIG. 8 is an exemplary flowchart depicting steps taken to detect a device in proximity to a touchscreen computer system and create a corresponding virtual device instance on the touchscreen computer system. Processing commences at 800, whereupon the process detects a physical device in proximity to the touchscreen system (step 810). For example, the process may utilize a wireless personal area network (WPAN) technology, such as Bluetooth, to detect a mobile phone in proximity to the touch sensitive computer system. At step 820, the process establishes a wireless connection with the physical device, such as wireless connection 330 shown in FIG. 3.

In one embodiment, the process proceeds through a registration process to determine if a user of the physical device is the registered user. For example, the process may identify the physical device (via phone number, etc.) and retrieve registered user information from a third party that may include a picture of the registered user. The process compares the picture with current user information received from the physical device (e.g., an image of the current user obtained from the physical device's camera) to determine if the current user is the registered user. When the process determines a match, the process proceeds with establishing a wireless connection with the physical device. When the process does not determine a match, the process prohibits virtual device instance generation and may send a notification to authorities if so configured.

At step 830, the process receives configuration data from the physical device over the wireless connection (e.g., configuration information 340 shown in FIG. 3). In one embodiment, the configuration information includes device identification information (e.g., model number), and may also include application and file information such as which applications are loaded onto the physical device. In another embodiment, the process receives the device identification information and then requests the application or file information from the physical device after determining a particular virtual device instance for which to display on touchscreen computer system 300.

The process, at step 840, identifies a device type corresponding to the device identification information and displays a corresponding virtual device instance on the touchscreen, such as virtual device instance 350 shown in FIG. 3. In one embodiment, computer system 300 maintains a set of virtual device instance properties, similar to that of maintaining a group of software drivers. As such, computer system 300 is able to display a corresponding virtual device instance when computer system 300 determines physical device 320's model number.

At step 850, the process identifies device data (applications, files, etc.) stored on the physical device and adds virtual data instances (virtual application icons) on the displayed virtual device instance accordingly. For example, referring to FIG. 3, physical device 320 displays six icons, which may be application icons, images, etc., and virtual device instance 350 includes six corresponding virtual device icons 370.

The process determines as to whether more devices are in proximity to the computer system (decision 860). If the process detects more devices, then decision 860 branches to the 'yes' branch, whereupon the process establishes a wireless connection with the proximate device and displays a corresponding virtual device instance on the touchscreen. On the other hand, if the process does not detect more devices, then decision 860 branches to the 'no' branch. FIG. 8 processing thereafter ends at 870.

Figure 9:
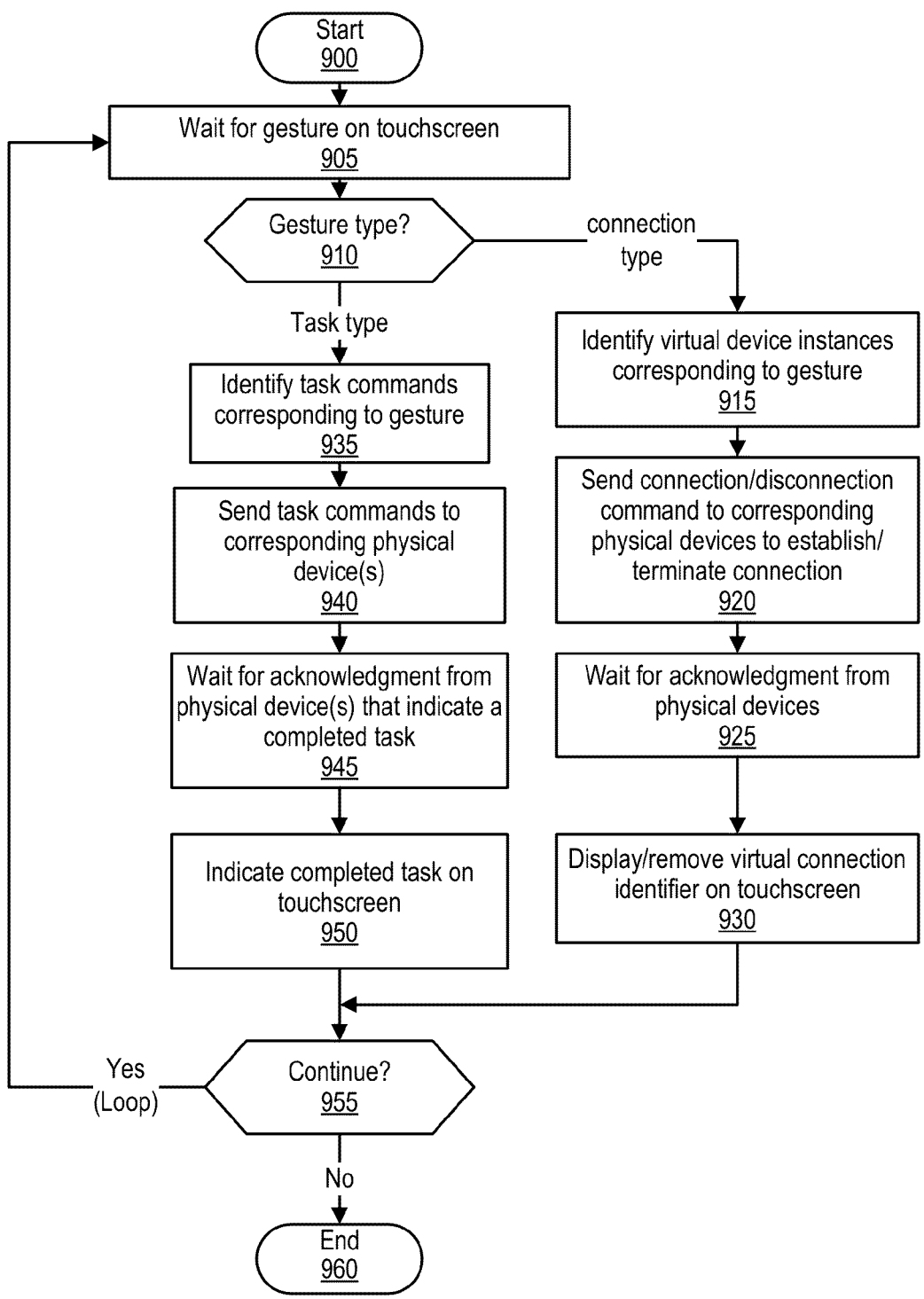
FIG. 9 is an exemplary flowchart depicting steps taken to detect touchscreen gestures on a touchscreen and send instructions to a physical device corresponding to the touchscreen gestures.

FIG. 9 is an exemplary flowchart depicting steps taken to detect touchscreen gestures on a touchscreen computer system and send instructions to a wirelessly connected physical device corresponding to the touchscreen gestures. Processing commences at 900, whereupon the process waits for a touchscreen gesture on touchscreen computer system 300 (step 905).

When the process detects a touchscreen gesture, the process determines as to whether the touchscreen gesture is a connection type gesture to connect/disconnect two physical devices or a task-type gesture, such as to transfer data between devices (decision 910). For example, a connection type gesture may involve the user performing a swiping gesture between two unconnected devices, such as connection gesture 525. In one embodiment, a connection type gesture may also involve the user performing a multi-touch "pinch" gesture where a first finger begins on a first virtual device instance and a second finger begins on a second virtual device instance. Regarding disconnect gestures, the user may swipe across a virtual connection indictor to disconnect two devices, such as disconnection gesture 700 shown in FIG. 7. In one embodiment, a disconnect type gesture may also involve the user performing a multi-touch "reverse pinch" or "zoom" gesture where a first finger begins on a first virtual device instance and a second finger begins on a second virtual device instance. Regarding task-type gestures, a user may wish to launch an application via selecting a virtual device icon 370 (FIG. 3), transfer data between devices via a data transfer gesture 630 (FIG. 6), or perform other device related actions (e.g., turn up volume, etc.) by performing gestures on the virtual device instance similar to how the user would perform the actions on the physical device.

If the touchscreen gesture is a connection type gesture, then decision 910 branches to the "connection type" branch. At step 915, the process identifies the virtual device instances corresponding to the touchscreen gesture for which the user wishes to connect or disconnect. The process at step 920 sends instructions to one of the physical devices to initiate (or terminate) a connection with the second device based upon the connection type gesture. At step 925, the process waits for acknowledgment from the physical devices as to whether the connection was established (terminated). When the process receives acknowledgement, the process display/removes a virtual connection identifier on the touchscreen. For example, FIG. 5 shows a touchscreen gesture to connect virtual device instance 520 to virtual device instance 350. Once the wireless connection is established (wireless connection 540), touchscreen computer system 300 displays virtual connection indicator 550 on the touchscreen 930.

Referring back to decision 910, if the touchscreen gesture is task-type gesture, then decision 910 branches to the "task type" branch. At step 935, the process analyzes the gesture and maps the touchscreen gesture to a physical gesture on the corresponding physical device. For example, the touchscreen gesture may select a virtual data instance on the touchscreen that corresponds to an application icon (application selection gesture). In this example, the process identifies instructions corresponding to the selected application icon.

At step 940, the process sends the instructions to the corresponding physical device. Using the example above, the instructions may instruct the corresponding physical device to open the application. At step 945, the process waits for acknowledgment from the physical device that the corresponding task is completed. At step 950, the process indicates the completed task on the touchscreen, such as displaying the open application on the virtual device instance.

The process determines as to whether to continue (decision 955). If the process should continue, then decision 955 branches to the 'yes' branch, which loops back to wait for more touch gestures. On the other hand, if the process should terminate, then decision 955 branches to the 'no' branch. FIG. 9 processing thereafter ends at 960.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a touchscreen, the method comprising:
   generating a first virtual device instance on the touchscreen in response to detecting a first physical device in proximity to the information handling system;
   generating a second virtual device instance on the touchscreen in response to detecting a second physical device in proximity to the information handling system;
   detecting a touch gesture on the touchscreen indicating a request to wirelessly connect the first physical device to the second physical device; and
   sending one or more instructions to the first physical device to establish a wireless connection with the second physical device.

2. The method of claim 1 wherein the first physical device and the second physical device are physically decoupled from the information handling system.

3. The method of claim 1 further comprising:
   receiving an acknowledgement that the wireless connection is established between the first physical device and the second physical device; and
   displaying a virtual connection link between the first virtual device instance and the second virtual device instance on the touchscreen in response receiving the acknowledgement.

4. The method of claim 3 further comprising:
   detecting a data transfer gesture on the touchscreen that indicates a request to transfer data from the first virtual device instance to the second virtual device instance; and
   sending one or more data transfer instructions to the first physical device that instructs the first physical device to transfer the data to the second physical device over the wireless connection.

5. The method of claim 3 further comprising:
   detecting a device disconnection gesture on the touchscreen, wherein the device disconnection gesture indicates a request to terminate the wireless connection between the first physical device and the second physical device;
   sending one or more device disconnection instructions to the first physical device that instructs the first physical device to terminate the wireless connection with the second physical device; and
   removing the virtual connection link on the touchscreen.

6. The method of claim 1 wherein the first physical device is a television, the method further comprising:
   enlarging the first virtual device instance on the touchscreen in response to detecting a multi-touch enlargement gesture on the touchscreen;
   receiving a television broadcast from the first physical device; and
   displaying the television broadcast on the enlarged first virtual device instance.

7. The method of claim 1 further comprising:
   identifying a plurality of applications stored on the first physical device;
   displaying a plurality of virtual icons on the first virtual device instance, wherein each of the plurality of virtual icons correspond to at least one of the plurality of applications;
   detecting an application selection gesture that selects one of the plurality of virtual icons; and
   sending one or more instructions to the first physical device that instructs the first physical device to execute a selected one of the stored applications that correspond to the selected virtual icon.

8. The method of claim 1 further comprising:
   receiving registered user information corresponding to the first physical device over a computer network;
   receiving current user information from the first physical device, wherein the current user information corresponds to a current user of the first physical device; and
   prohibiting the generation of the first virtual device instance based upon determining that the current user information does not match the registered user information.

9. An information handling system comprising:
   one or more processors;
   a touchscreen electronically accessible by at least one of the processors;
   a memory coupled to at least one of the processors; and
   a set of computer program instructions stored in the memory and executed by at least one of the processors in order to perform actions of:
      generating a first virtual device instance on the touchscreen in response to detecting a first physical device in proximity to the information handling system;
      generating a second virtual device instance on the touchscreen in response to detecting a second physical device in proximity to the information handling system;
      detecting a touch gesture on the touchscreen indicating a request to wirelessly connect the first physical device to the second physical device; and sending one or more instructions to the first physical device to establish a wireless connection with the second physical device.

10. The information handling system of claim 9 wherein the first physical device and the second physical device are physically decoupled from the information handling system.

11. The information handling system of claim 9 wherein the one or more processors perform additional actions comprising:
  receiving an acknowledgement that the wireless connection is established between the first physical device and the second physical device; and
  displaying a virtual connection link between the first virtual device instance and the second virtual device instance on the touchscreen in response receiving the acknowledgement.

12. The information handling system of claim 11 wherein the one or more processors perform additional actions comprising:
  detecting a data transfer gesture on the touchscreen that indicates a request to transfer data from the first virtual device instance to the second virtual device instance; and
  sending one or more data transfer instructions to the first physical device that instructs the first physical device to transfer the data to the second physical device over the wireless connection.

13. The information handling system of claim 11 wherein the one or more processors perform additional actions comprising:
  detecting a device disconnection gesture on the touchscreen, wherein the device disconnection gesture indicates a request to terminate the wireless connection between the first physical device and the second physical device;
  sending one or more device disconnection instructions to the first physical device that instructs the first physical device to terminate the wireless connection with the second physical device; and
  removing the virtual connection link on the touchscreen.

14. The information handling system of claim 9 wherein the first physical device is a television, and wherein the one or more processors perform additional actions comprising:
  enlarging the first virtual device instance on the touchscreen in response to detecting a multi-touch enlargement gesture on the touchscreen;
  receiving a television broadcast from the first physical device; and
  displaying the television broadcast on the enlarged first virtual device instance.

15. The information handling system of claim 9 wherein the one or more processors perform additional actions comprising:
  identifying a plurality of applications stored on the first physical device;
  displaying a plurality of virtual icons on the first virtual device instance, wherein each of the plurality of virtual icons correspond to at least one of the plurality of applications;
  detecting an application selection gesture that selects one of the plurality of virtual icons; and
  sending one or more instructions to the first physical device that instructs the first physical device to execute a selected one of the stored applications that correspond to the selected virtual icon.

16. A computer program product stored in a computer readable device, comprising computer program code that, when executed by an information handling system, causes the information handling system to perform actions comprising:
  generating a first virtual device instance on a touchscreen in response to detecting a first physical device in proximity to the information handling system;
  generating a second virtual device instance on the touchscreen in response to detecting a second physical device in proximity to the information handling system;
  detecting a touch gesture on the touchscreen indicating a request to wirelessly connect the first physical device to the second physical device; and
  sending one or more instructions to the first physical device to establish a wireless connection with the second physical device.

17. The computer program product of claim 16 wherein the first physical device and the second physical device are physically decoupled from the information handling system.

18. The computer program product of claim 16 wherein the information handling system performs additional actions comprising:
  receiving an acknowledgement that the wireless connection is established between the first physical device and the second physical device; and
  displaying a virtual connection link between the first virtual device instance and the second virtual device instance on the touchscreen in response receiving the acknowledgement.

19. The computer program product of claim 18 wherein the information handling system performs additional actions comprising:
  detecting a data transfer gesture on the touchscreen that indicates a request to transfer data from the first virtual device instance to the second virtual device instance; and
  sending one or more data transfer instructions to the first physical device that instructs the first physical device to transfer the data to the second physical device over the wireless connection.

20. The computer program product of claim 18 wherein the information handling system performs additional actions comprising:
  detecting a device disconnection gesture on the touchscreen, wherein the device disconnection gesture indicates a request to terminate the wireless connection between the first physical device and the second physical device;
  sending one or more device disconnection instructions to the first physical device that instructs the first physical device to terminate the wireless connection with the second physical device; and
  removing the virtual connection link on the touchscreen.

* * * * *